(12) United States Patent
Shudo

(10) Patent No.: US 12,447,667 B2
(45) Date of Patent: Oct. 21, 2025

(54) IMPRINT APPARATUS AND ARTICLE MANUFACTURING METHOD

(71) Applicant: CANON KABUSHIKI KAISHA, Tokyo (JP)

(72) Inventor: Shinichi Shudo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 477 days.

(21) Appl. No.: 17/563,549

(22) Filed: Dec. 28, 2021

(65) Prior Publication Data
US 2022/0212394 A1 Jul. 7, 2022

(30) Foreign Application Priority Data

Jan. 6, 2021 (JP) .................................. 2021-001045

(51) Int. Cl.
| | |
|---|---|
| *B29C 33/42* | (2006.01) |
| *B29C 33/04* | (2006.01) |
| *B29C 59/00* | (2006.01) |
| *B29C 59/02* | (2006.01) |
| B29C 37/00 | (2006.01) |
| G03F 7/00 | (2006.01) |

(52) U.S. Cl.
CPC .............. *B29C 59/02* (2013.01); *B29C 33/04* (2013.01); *B29C 33/424* (2013.01); *B29C 59/002* (2013.01); B29C 2037/90 (2013.01); G03F 7/0002 (2013.01)

(58) Field of Classification Search
CPC ....... B29C 59/02; B29C 33/04; B29C 33/424; B29C 59/002; B29C 2037/90; B29C 59/00; B29C 33/00; G03F 7/0002
See application file for complete search history.

(56) References Cited

U.S. PATENT DOCUMENTS

| | | | |
|---|---|---|---|
| 11,054,739 | B2 | 7/2021 | Khusnatdinov |
| 2005/0275125 | A1 | 12/2005 | Kawakami et al. |
| 2017/0106408 | A1 | 4/2017 | Nakata et al. |
| 2020/0033720 | A1 | 1/2020 | Khusnatdinov et al. |

FOREIGN PATENT DOCUMENTS

| | | |
|---|---|---|
| JP | 2005353858 A | 12/2005 |
| JP | 2017068087 A | 4/2017 |
| JP | 2020017726 A | 1/2020 |
| JP | 2020043160 A | 3/2020 |
| KR | 1020200090948 A | 7/2020 |

*Primary Examiner* — Alison L Hindenlang
*Assistant Examiner* — Erica Hartsell Funk
(74) *Attorney, Agent, or Firm* — ROSSI, KIMMS & McDOWELL LLP

(57) ABSTRACT

The present invention provides an imprint apparatus including a holding member configured to hold the mold, a spring member configured to connect the holding member to a base unit that supports the holding member, a driving unit provided between the holding member and the base unit and configured to drive the holding member in a vertical direction with respect to the base unit, and a regulating surface configured to regulate, in a vertical range in which the holding member is driven by the driving unit, a driving end on a side that is towards the base unit, wherein the driving unit performs a driving for pressing the holding member against the regulating surface, and in the driving, generates heat while pressing the holding member against the regulating surface.

6 Claims, 6 Drawing Sheets

IMPRINT APPARATUS AND ARTICLE MANUFACTURING METHOD

BACKGROUND OF THE INVENTION

Field of the Invention

The present invention relates to an imprint apparatus and an article manufacturing method.

Description of the Related Art

Demand for miniaturization of semiconductor devices has increased, and in addition to conventional photolithography technology, microfabrication techniques for shaping an imprint material on a substrate using a mold and forming a fine uneven pattern in the mold on the substrate are attracting attention. Such a microfabrication technique, also known as an imprint technique, can form a fine pattern (structure) on the order of nanometers on a substrate.

In the imprint technique, one of the methods for curing an imprint material is a photocuring method. In the photocuring method, a pattern of an imprint material is formed on a substrate by irradiating light while the imprint material supplied to a shot region on the substrate and the mold are in contact with each other and curing the imprint material, and then separating the mold from the cured imprint material.

In imprint apparatuses that use the imprint technique, a mold holding unit (imprint unit) includes a holding member (movable portion) for holding a mold, an actuator which is a driving source of the holding member, and a base unit for supporting the holding member. The holding member and the base unit are connected via a spring member for holding and compensating (the weight of) the actuator and the holding member. In the mold holding unit, the actuator and the spring member are arranged in parallel, and the holding member is held by the spring member. Therefore, when driving the holding member, the actuator only needs to generate force according to the expansion and contraction of the spring member, which corresponds with the position of the holding member, and thus, reducing driving load.

When the imprint process is continuously performed using such an imprint apparatus, the temperature of the holding member increases due to the actuator generating heat. Since a thermal time constant of the holding member is long, and it takes several tens of minutes from the start of the imprint process until the temperature of the holding member becomes constant (enters a steady state), at least a plurality of substrates will be processed during that time. Thus, variation in the result of the imprint process, such as overlay accuracy, arises in the substrate processed when the holding member is in a thermally transient state and the substrate processed when the holding member is in a thermally steady state due to a difference in the temperature state of the holding member.

In view of this, Japanese Patent Laid-Open No. 2020-17726 proposes a technique for suppressing transient phenomena in the temperature of the holding member which occurs at the initial stage of the start of the imprint process. In Japanese Patent Laid-Open No. 2020-17726, when causing the holding member to enter an idle state, by setting a root mean square current value of a current to be applied to the actuator to be equal to that of when the imprint process is continuously performed, the holding member is made to wait at a higher position (standby position) than a position at which the holding member and the spring member are balanced.

In recent years, further improvement in throughput has been in demand for the imprint apparatus, and in order to satisfy such a demand, it is conceivable to improve the driving performance of the mold holding unit, for example. However, to improve the driving performance of the mold holding unit, the current applied to the actuator for driving the holding member needs to be increased, which leads to an increase in the amount of heat generated by the actuator. Therefore, in the technique disclosed in Japanese Patent Laid-Open No. 2020-17726, when causing the holding member to enter the idle state, the standby position at which the holding member is made to wait needs to be raised in accordance with the amount of heat generated by the actuator. A case where the device power supply is accidentally lost in such a situation is considered; the holding member held by the spring member falls in the vertical direction, and then bounces, and the amplitude of the bounce increases proportionally to the height of the standby position of the holding member. Therefore, if the drop occurs with (the orientation of) the holding member in a tilted state, the mold held by the holding member may come in contact with the substrate, possibly resulting in the mold or substrate or both being damaged.

SUMMARY OF THE INVENTION

The present invention provides an imprint apparatus which is advantageous in preventing mold damage while suppressing transient phenomena in the temperature of a holding member for holding a mold.

According to one aspect of the present invention, there is provided an imprint apparatus that performs an imprint process in which a pattern of an imprint material is formed on a substrate using a mold, the apparatus including a holding member configured to hold the mold, a spring member configured to connect the holding member to a base unit that supports the holding member, a driving unit provided between the holding member and the base unit and configured to drive the holding member in a vertical direction with respect to the base unit, and a regulating surface configured to regulate, in a vertical range in which the holding member is driven by the driving unit, a driving end on a side that is towards the base unit, wherein the driving unit performs first driving for causing the mold to come in contact with the imprint material on the substrate and second driving for pressing the holding member against the regulating surface, and in the second driving, generates heat while pressing the holding member against the regulating surface.

Further aspects of the present invention will become apparent from the following description of exemplary embodiments with reference to the attached drawings.

DESCRIPTION OF THE EMBODIMENTS

Figure 1:
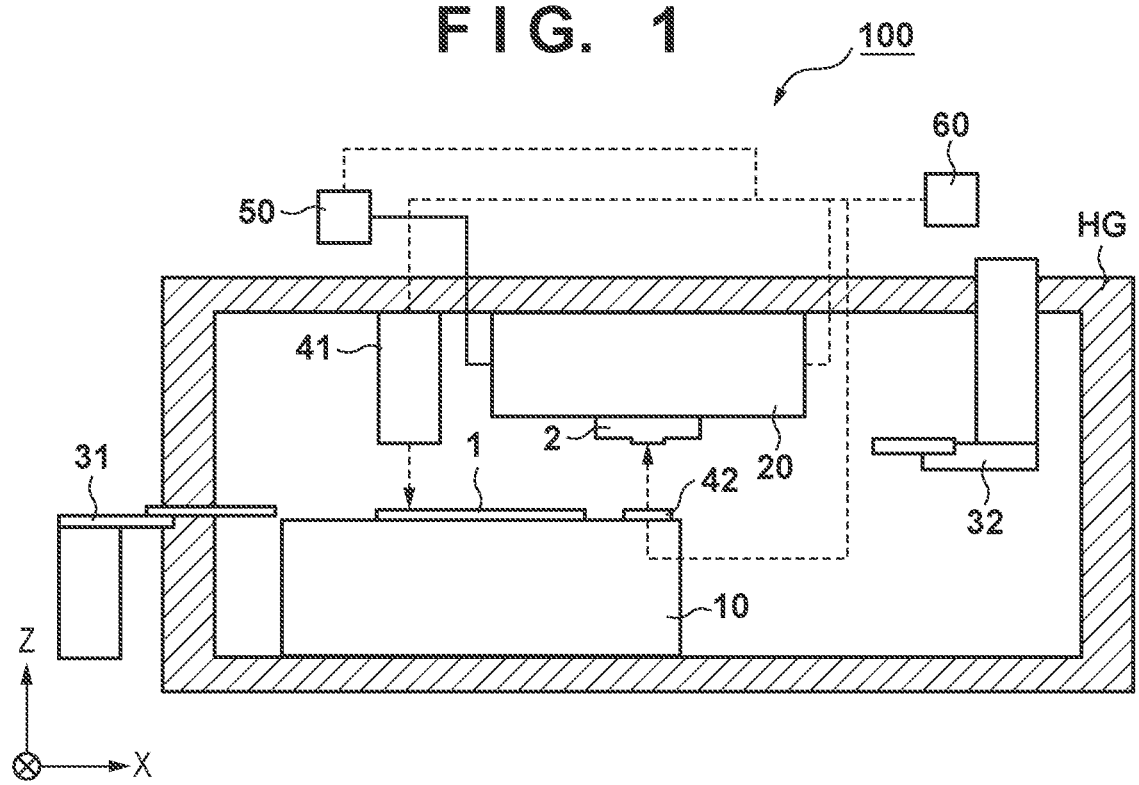
FIG. 1 is a schematic view illustrating configurations of an imprint apparatus according to an aspect of the present invention.

Hereinafter, embodiments will be described in detail with reference to the accompanying drawings. The following embodiments do not limit the claimed invention. Although a plurality of features are described in the embodiments, not all of the plurality of features are essential to the invention, and the plurality of features may be arbitrarily combined. Furthermore, in the accompanying drawings, the same reference numerals are assigned to the same or similar components, and a repetitive description thereof is omitted.

FIG. 1 is a schematic view illustrating configurations of an imprint apparatus 100 according to an aspect of the present invention. The imprint apparatus 100 is employed in a lithography process, which is a process for manufacturing a device such as a semiconductor element, liquid crystal display element, or magnetic storage medium as an article, and is a lithography apparatus for forming a pattern on a substrate. The imprint apparatus 100 forms a pattern of a cured product on which a pattern of a mold has been transferred by bringing an uncured imprint material supplied onto a substrate in contact with a mold, and then applying curing energy to the imprint material.

As the imprint material, a material (curable composition) to be cured by receiving curing energy is used. An example of the curing energy that is used is electromagnetic waves, heat, or the like. As the electromagnetic waves, for example, infrared light, visible light, ultraviolet light, and the like selected from the wavelength range of 10 nm (inclusive) to 1 mm (inclusive) is used.

The curable composition is a composition cured by light irradiation or heating. The photo-curable composition cured by light irradiation contains at least a polymerizable compound and a photopolymerization initiator, and may contain a nonpolymerizable compound or a solvent, as needed. The nonpolymerizable compound is at least one type of material selected from a group comprising of a sensitizer, a hydrogen donor, an internal mold release agent, a surfactant, an antioxidant, a polymer component, and the like.

The imprint material may be applied in a film shape onto the substrate by a spin coater or a slit coater. The imprint material may be applied, onto the substrate, in a droplet shape or in an island or film shape formed by connecting a plurality of droplets using a liquid injection head. The viscosity (the viscosity at 25° C.) of the imprint material is, for example, 1 mPa·s (inclusive) to 100 mPa·s (inclusive).

As the substrate, glass, ceramic, a metal, a semiconductor, a resin, or the like is used, and a member made of a material different from that of the substrate may be formed on the surface of the substrate, as needed. More specifically, examples of the substrate include a silicon wafer, a semiconductor compound wafer, silica glass, and the like.

In the specification and the accompanying drawings, directions will be indicated on an XYZ coordinate system in which directions parallel to the surface of a substrate 1 are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are OX, OY, and OZ, respectively.

The imprint apparatus 100 includes a substrate holding unit 10 for holding the substrate 1 and driving in a horizontal direction (X direction or Y direction) and a substrate conveyance unit 31 for conveying the substrate 1 between a substrate housing unit (not illustrated) and the substrate holding unit 10. Further, the imprint apparatus 100 includes a mold holding unit 20 (imprint unit) for holding a mold 2 and driving in a vertical direction (Z direction) and a mold conveyance unit 32 for conveying the mold 2 between a mold housing unit (not illustrated) and the mold holding unit 20.

The substrate holding unit 10 holds the substrate 1 by, for example, vacuum chucking the substrate 1, and maintains the holding position thereof. The mold holding unit 20 holds the mold 2 by, for example, vacuum chucking the mold 2, and maintains the holding position thereof. The substrate holding unit 10 and the mold holding unit 20 may hold the substrate 1 and the mold 2 using an electrostatic method instead of a chucking method.

Further, the imprint apparatus 100 includes a first measuring unit 41 provided in a housing HG (fixed plane) of the imprint apparatus 100, and a second measuring unit 42 provided in the substrate holding unit 10.

By scanning the substrate holding unit 10 in the horizontal direction with respect to the first measuring unit 41, the first measuring unit 41 can measure the distance to the substrate 1 held in the substrate holding unit 10. By scanning the substrate holding unit 10 in the horizontal direction with respect to the mold 2, the second measuring unit 42 provided in the substrate holding unit 10 can measure the distance to the mold 2. A laser displacement meter or spectroscopic interferometer, for example, may be used for the first measuring unit 41 and the second measuring unit 42; however, another measuring device may be used so long as the distance can be measured accurately without contact.

Further, the imprint apparatus 100 has an adjusting unit 50 for adjusting the temperature of the mold holding unit 20. The adjusting unit 50 cools the mold holding unit 20 using a fluid refrigerant containing a liquid or gas, specifically, by supplying the fluid refrigerant to the mold holding unit 20. The adjusting unit 50 employs an air cooling method that uses clean dry air (CDA) or liquid cooling method that uses pure water brine, or the like, but the fluid refrigerant is not limited. In the adjusting unit 50, the control target of the fluid for adjusting the temperature of the mold holding unit 20 is at least one of a temperature, flow rate, and pressure of the fluid. For example, when compressed clean dry air and vortex cooler is used in the adjusting unit 50, the temperature of the mold holding unit 20 can be controlled by changing any of the temperature flow rate, and pressure of the fluid. However, regarding temperature control of the mold holding unit 20, the load (e.g., calculation, etc.) required for temperature control can be reduced by setting one of the temperature, flow rate, and pressure of the fluid variable and fixing (maintaining at a constant) the others.

The imprint apparatus 100 includes a control unit 60 configured by a computer including a CPU, a memory, and the like. The control unit 60 operates the imprint apparatus 100 by controlling each unit of the imprint apparatus 100 in an integrated manner in accordance with a program stored in the storage unit, for example. The control unit 60 controls the imprint process of forming a pattern of the imprint material on the substrate using the mold 2. In the present embodiment, the control unit 60 controls the current value applied to actuators 22 and controls (e.g., performs feedback control for) the control target of the fluid supplied from the adjusting unit 50.

Figure 2:
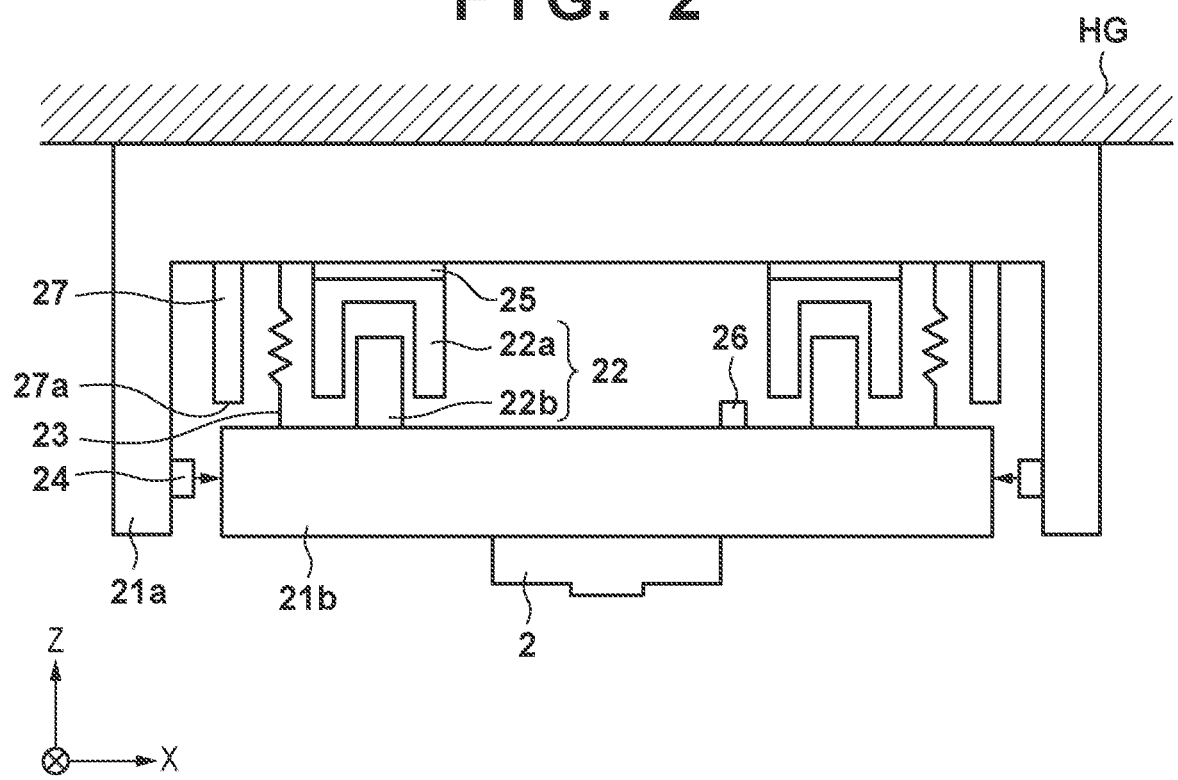
FIG. 2 is a view illustrating a configuration of a mold holding unit of the imprint apparatus illustrated in FIG. 1.

Referring to FIG. 2, the mold holding unit 20 will be described in detail. FIG. 2 is a diagram illustrating a configuration of the mold holding unit 20. As illustrated in FIG. 2, the mold holding unit 20 includes a holding member 21b for holding the mold 2, and a base unit 21a for supporting the holding member 21b. The base unit 21a is provided in a housing HG of the imprint apparatus 100. The holding member 21b is connected to the base unit 21a via a plurality of actuators 22 and a plurality of spring members 23, each of which are arranged in parallel.

The actuators 22 are provided between the holding member 21b and the base unit 21a and function as a driving unit for driving the holding member 21b in the vertical direction with respect to the base unit 21a. The holding member 21a for holding the mold 2 functions as a movable portion that is driven in the vertical direction by the actuators 22. The actuators 22 are configured by, for example, a voice coil actuator, and includes a magnet-side stator 22a and a coil-side movable element 22b. In the present embodiment, as illustrated in FIG. 2, the stators 22a are provided on the base unit 21a and the movable elements 22b are provided on the holding member 21b; however, the movable elements 22b may be provided on the base unit 21a and the stators 22a may be provided on the holding member 21b. The actuators 22 may also be replaced by another driving unit capable of driving (capable of linearly moving) the holding member 21b in the vertical direction by current control or voltage control.

The spring members 23 connect the holding member 21b for supporting the mold 2 to the base unit 21a. The spring members 23, by supporting (the weight of) the mold 2 and the holding member 21b, reduces the driving load of the actuators 22. The spring members 23 may be replaced with elastic members including rubber or the like.

The actuators 22 and the spring members 23 are provided at equal intervals (equal angles) with respect to the center of the mold holding unit 20 (holding member 21b), so that the driving loads of the respective actuators are equal.

Here, a position of the holding member 21b at which the weight of the holding member 21b while holding the mold 2 (gravity applied to the holding member 21b) and the tension of the spring members 23 (elastic force) are balanced in a state where no current is applied to the actuators 22 is a balanced position. Incidentally, the state of not applying a current to the actuators 22 is a state of not generating force (driving force) for driving the holding member 21b in the actuators 22.

The amount by which the holding member 21b is driven from the balanced position by the actuators 22 is D(t), a current value applied to the actuators 22 at that time is I(t), a combined thrust constant of the actuators 22 is Km, and a combined spring constant of the spring members 23 is Ks. In this case, force F (driving force) that the actuators 22 generate is expressed by the following Equation (1).

$$F = Km \times I(t) = Ks \times D(t) \quad (1)$$

Referring to Equation (1), the amount D(t) by which the holding member 21b is driven and the current value I(t) are in a proportional relationship.

Further, the mold holding unit 20, as illustrated in FIG. 2, further includes a position measuring unit 24 for measuring the position in the vertical direction (vertical position) of the holding member 21b, temperature adjustment target portions 25, and a temperature measuring unit 26 for measuring the temperature of the holding member 21b.

The position measuring unit 24 is provided on the base unit 21a and measures the vertical position of the holding member 21b in accordance with the driving of the holding member 21b. An encoder, for example, is used as the position measuring unit 24. The driving of the holding member 21b may be controlled based on the current value applied to the actuators 22 or the measurement result of the position measuring unit 24.

The temperature adjustment target portions 25 are portions to be a target of temperature adjustment by the adjusting unit 50 and are provided between the base unit 21a and the actuators 22 (stators 22a). The temperature of the holding member 21b can be adjusted (to cool the holding member 21b) via the actuators 22 by supplying the temperature-adjusted fluid from the adjusting unit 50 to the temperature adjustment target portions 25. For example, when the adjusting unit 50 employs the air cooling method, the temperature of the holding member 21b can be adjusted by supplying temperature-adjusted gas between the stators 22a and the movable elements 22b via the temperature adjustment target portions 25. When the adjusting unit 50 employs the liquid cooling method, the temperature of the holding member 21b can be adjusted by supplying the temperature-adjusted liquid to the temperature adjustment target portions 25, which are in direct contact with the stators 22a. In the present embodiment, the temperature adjustment target portions 25 are provided between the base unit 21a and the actuators 22 but may be provided between the actuators 22 (movable elements 22b) and the holding member 21b.

Further, regardless of whether the adjusting unit 50 adopts the air cooling method or liquid cooling method, the temperature adjustment target portions 25 need to be considered so that the flow of fluid, in addition to the cooling efficiency and cooling capacity, is not a disturbance element for the holding member 21b. For example, if the adjusting unit 50 employs the liquid cooling method, the temperature adjustment target portions 25 will be in direct contact with the stators 22a, and therefore, the cooling efficiency and cooling capacity (heat transfer efficiency) will be higher than when the adjusting unit 50 employs the air cooling method. However, pulsation in the temperature adjustment target portions 25 caused by the flow of liquid may be a disturbance element for the holding member 21b.

At least one temperature measuring unit 26 need only be provided. Further, although the temperature measuring unit 26 is provided in the holding member 21b in the present embodiment, it may be provided on an actuator 22.

Furthermore, in order to suppress the vertical range (driving region) in which the holding member 21b is driven by the actuators 22, the mold holding unit 20 includes regulating members 27. The regulating members 27 form regulating surfaces 27a for regulating the driving limit on the vertical range in which the holding member 21b is driven towards the base unit 21a side (the upper limit of the driving range). The regulating members 27 may be provided on either the base unit 21a or the holding member 21b or either the stators 22a or the movable elements 22b of the actuators 22 so long as the driving range of the holding member 21a can be regulated with the regulating surfaces 27a.

The regulating members 27 are configured by metal members of aluminum alloy, stainless alloy, or the like or resin members of POM, PTFE, or the like. However, as described above, the regulating members 27 may directly contact either the base unit 21a or the holding member 21b or either the stators 22a or the movable elements 22b and, therefore, may be configured by resin members. In the present embodiment, the regulating members 27 are fixed to the base unit 21a but are not limited thereto. For example, the regulating members 27 may be provided on the base unit 21a via actuators so as to be capable of being driven in the vertical and horizontal directions, thereby making the positions of the regulating members 27, i.e., the positions of the regulating surfaces 27a variable.

Figure 3:
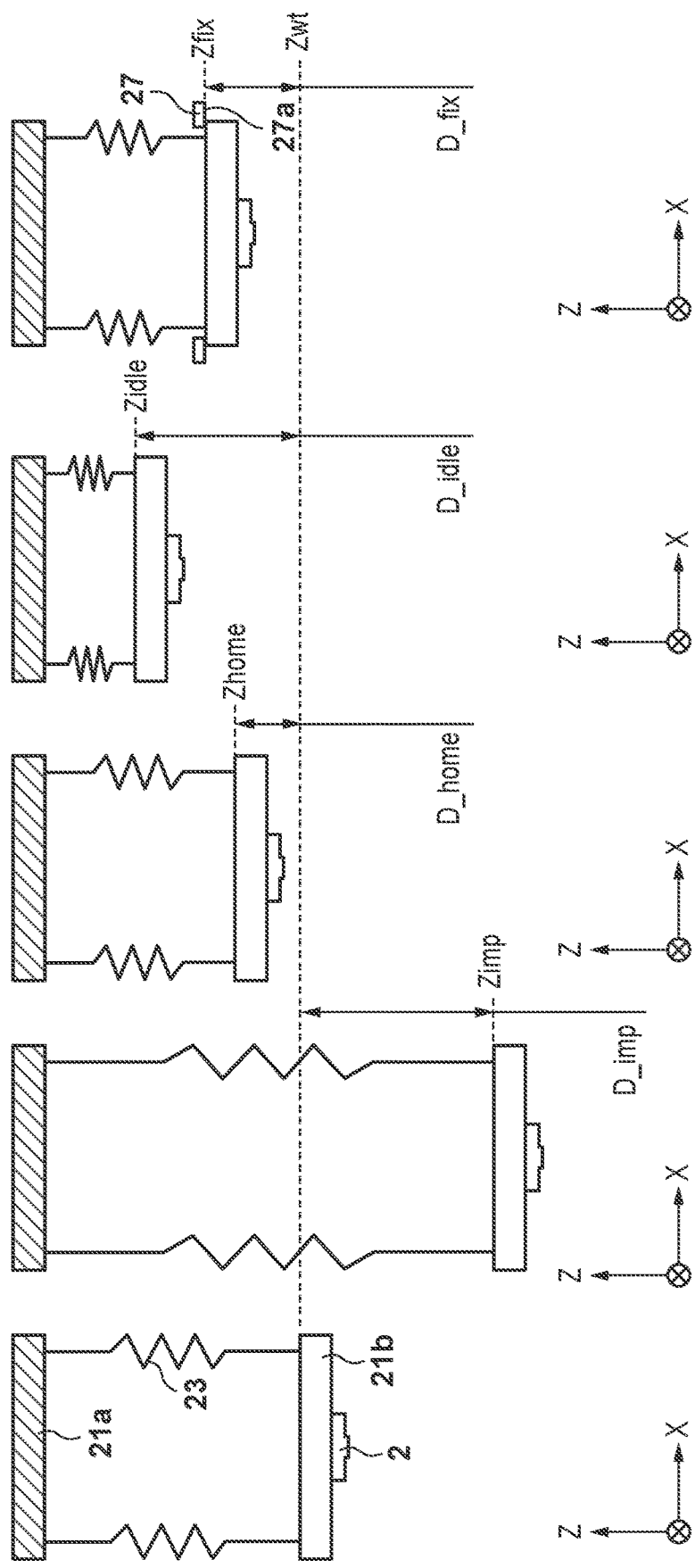
FIG. 3A to FIG. 3E are views illustrating a positional relation of a holding member of the mold holding unit illustrated in FIG. 2.

FIGS. 3A to 3E are views illustrating the positional relation of the mold holding unit 20, more specifically, the holding member 21b. FIG. 3A illustrates a balanced position Zwt (first position) which is a position of the holding member 21b at which the weight of the holding member 21b while holding the mold 2 and the tension of the spring members 23 are balanced. FIG. 3B illustrates an imprint position Zimp (second position) which is a position of the holding member 21b at which the imprint material on the substrate and the mold 2 come in contact with each other. As illustrated in FIG. 3B, the distance between the balanced position Zwt and the imprint position Zimp is D_imp.

FIG. 3C illustrates a home position Zhome (mold release completion position) which is a position of the holding member 21b at which the mold release operation in which the mold 2 is separated from the imprint material on the substrate by driving the holding member 21b in the +Z direction from the imprint position Zimp is completed. When continuously performing the imprint process, the imprint operation for driving the holding member 21b in the −Z direction from the home position Zhome is started. In addition, the home position Zhome may be set at the same position as the balanced position Zwt. As illustrated in FIG. 3C, the distance between the balanced position Zwt and the home position Zhome is D_home.

FIG. 3D illustrates a standby current position Zidle which is a position of the holding member 21b at which the holding member 21b is driven in the +Z direction at a current value that is equal to a root mean square current value I_mean of the current applied to the actuators 22 when continuously performing the imprint process. As illustrated in FIG. 3D, the distance between the balanced position Zwt and the standby current position Zidle is D_idle.

FIG. 3E illustrates a regulated position Zfix which is a position of the holding member 21b at which the holding member 21b and the regulating surfaces 27a of the regulating members 27 come in contact with each other. As illustrated in FIG. 3E, the distance between the balanced position Zwt and the regulated position Zfix is D_fix.

Further, in the present embodiment, as illustrated in FIG. 3E, the regulating members 27 are provided so as to be positioned on the base unit 21a side with respect to the balanced position Zwt (+Z direction), i.e., the regulating surfaces 27a are provided so as to be positioned higher than the balanced position Zwt. Further, in the present embodiment, the regulating members 27 are provided so that the distance between the regulating surfaces 27a and the balanced position Zwt is shorter than the distance between the imprint position Zimp and the balanced position Zwt.

The current values applied to the actuators 22 corresponding to the positions of the holding member 21b illustrated in FIG. 3B, FIG. 3C, FIG. 3D, and FIG. 3E, respectively, are I_imp, I_home, I_idle, and I_fix, respectively. In this case, the relationship between the distances D_imp, D_home, D_idle, and D_fix and the relationship between the current values I_imp, I_home (I_mean), I_idle, and I_fix are expressed by the following Equations (2) and (3).

$$D\_imp > D\_idle > D\_fix \geq D\_home \geq 0 \quad (2)$$

$$I\_imp > I\_idle = I\_mean > I\_fix \geq I\_home \geq 0 \quad (3)$$

Referring to FIG. 3E, the current value required to position the holding member 21b at the regulated position Zfix (to maintain at the regulated position Zfix) is I_fix. However, in FIG. 3E, a current value equal to the root mean square current value I_mean is applied to the actuators 22 to press (push) the holding member 21b against the regulating surfaces 27a of the regulating members 27. Considering mass production, the imprint position Zimp (distance D_imp) differs depending on (the weight of) the mold 2 used in the imprint apparatus 100. For example, even when using a thick mold 2 by which the distance D_imp is substantially shortened, it is preferable that when the root mean square current value I_mean is applied to the actuators 22, the holding member 21b comes in contact with the regulating surfaces 27b of the regulating members 27. Therefore, if the manufacturing error (change in distance D_imp) in the thickness of the mold 2 is D_err, it is preferable that the distance D_fix corresponding to the regulated position Zfix satisfies the following Equation (4).

$$D\_fix < D\_idle - D\_err \quad (4)$$

Further, a force F_fix that the regulating surfaces 27a of the regulating members 27 receive from the holding member 21b (force with which the holding member 21b pushes against the regulating surfaces 27a) is represented by the following Equation (5) using a combined thrust constant Km of the actuators 22.

$$F\_fix = Km \times (I\_mean - I\_fix) \quad (5)$$

In the present embodiment, in the idle state, a current value corresponding to the force F_fix for pushing the holding member 21b against the regulating surfaces 27a is applied to the actuators 22 in addition to the current value I_fix required for maintaining the holding member 21b at the regulated position Zfix. By this, a current value equal to the root mean square current value I_mean is applied to the actuators 22, allowing the amount of heat generated by the actuators 22 to be equal to the amount of heat generated by the actuators 22 when the imprint process is continuously performed. The idle state is a state before the imprint process is started.

Thus, in the present embodiment, in the idle state, as illustrated in FIG. 3E, the holding member 21b is pressed against the regulating surfaces 27a of the regulating members 27, so in that state, the actuators 22 generate heat. Specifically, the current value applied to the actuators 22 is controlled so that the root mean square current value of the current applied to the actuators 22 is equal to the root mean square current value of the current applied to the actuators 22 when the imprint process is continuously performed. Thus, when continuously performing the imprint process from the idle state, it is possible to suppress the transient phenomenon of the temperature of the holding member 21b which occurs at the initial stage of the start of the imprint process.

Further, in the present embodiment, the regulating members 27 are provided so that the distance between the regulating surfaces 27a and the balanced position Zwt is above the balanced position Zwt and is shorter than the distance between the imprint position Zimp and the balanced position Zwt. Therefore, even if the device power supply is accidentally lost in the idle state, i.e., a state in which the holding member 21b is pressed against the regulating surfaces 27a, and the holding member 21b bounces, the mold 2 held in the holding member 21b and the substrate 1 will not come in contact with each other. Therefore, it is possible to prevent damage to the mold 2 and the substrate 1 caused by the mold 2 and the substrate 1 coming in contact with each other.

In the present embodiment, a state in which the imprint process is continuously performed and an idle state before the imprint process is started have been described as examples, but the present invention is not limited thereto. The actuators 22 perform first driving for causing the mold 2 and the imprint material on the substrate to come in contact with each other (driving for imprint processing) and second driving for pressing the holding member 21b to the regulating surfaces 27a of the regulating members 27 (driving for idle state). At this time, the actuators 22, in the first driving, drives the holding member 21b towards the side that is opposite to the base unit 21a side (−Z direction) and, in the second driving, drives the holding member 21b towards the base unit 21a side (+Z direction). In this case, in the second driving, the actuators 22 only need to generate heat while pressing the holding member 21b to the regulating surfaces 27a of the regulating members 27.

Figure 4:
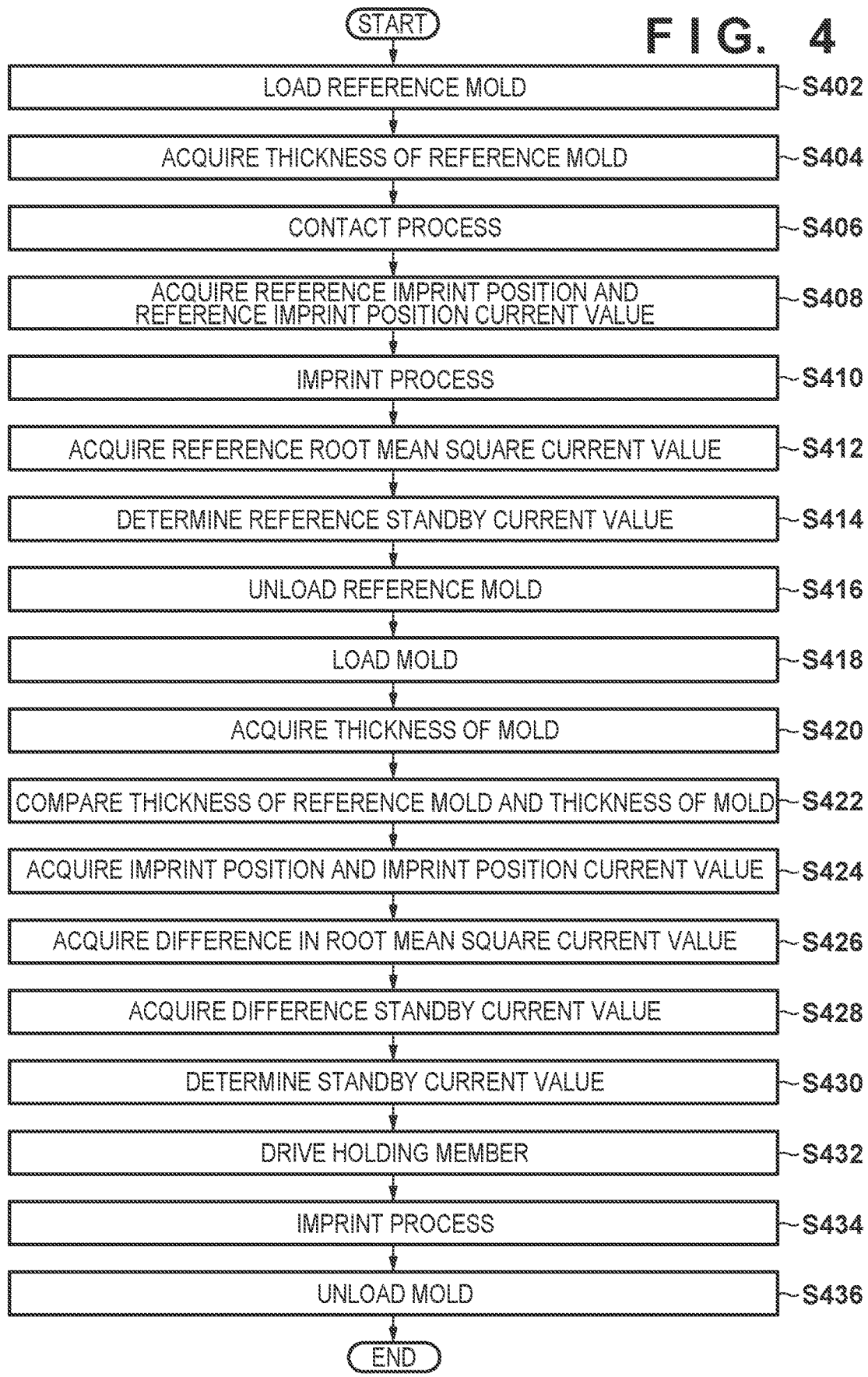
FIG. 4 is a flowchart for explaining an operation of the imprint apparatus illustrated in FIG. 1.

The operation of the imprint apparatus 100 will be described with reference to FIG. 4. Such an operation is performed by the control unit 60 collectively controlling each unit of the imprint apparatus 100. FIG. 4 is a flowchart for explaining an operation of the imprint apparatus 100. Here, a description will be given focusing on, in particular, a sequence until the imprint process is continuously performed.

As described above, in the imprint apparatus 100, the position of the holding member 21b when the imprint material and the mold 2 on the substrate are in contact with each other (imprint position Zimp) varies depending on the thickness of the mold 2 used in the imprint apparatus 100. Therefore, the root mean square current value of the current applied to the actuators 22 when the imprint process is continuously performed also varies depending on the thickness of the mold 2 used in the imprint apparatus 100. In the imprint apparatus 100, since the mold 2 is a consumable, it is periodically or irregularly replaced with a new mold 2. Therefore, it is necessary to determine, in accordance with the mold 2 used in the imprint apparatus 100, a standby current value in the idle state, that is, the root mean square current value of the current applied to the actuators 22 when the imprint process is continuously performed, without actually performing the imprint process.

Referring to FIG. 4, in step S402, a reference mold having a reference thickness is loaded into the imprint apparatus 100. Specifically, the reference mold is loaded from the outside of the imprint apparatus 100 to the inside by the mold conveyance unit 32, and then the reference mold is held by the mold holding unit 20 (the holding member 21b).

In step S404, the thickness (height) of the reference mold loaded in step S402 is acquired. Specifically, a reference mold thickness H_mld_ref is acquired by measuring the distance to the reference mold in the second measuring unit 42 while scanning the substrate holding unit 10 in the horizontal direction with respect to the reference mold.

In step S406, a contact process in which the reference mold and the substrate 1 are actually brought into contact with each other is performed. Since the parts used in the imprint apparatus 100 have manufacturing errors and assembly errors, in order to obtain an accurate imprint position (the distance between the balanced position and the imprint position), it is necessary to perform the contact process.

In step S408, a reference imprint position, which is the position of the holding member 21b when the reference mold and the substrate 1 are in contact with each other, and a reference imprint position current value are acquired based on the result of the contact process. Specifically, a reference imprint position D_imp_ref is acquired using the measurement result of the position measuring unit 24 when the reference mold and the substrate 1 are in contact with each other. Further, the current value applied to the actuators 22 when the holding member 21b reaches the reference imprint position is acquired as a reference imprint position current value I_imp_ref.

In step S410, the imprint process is continuously performed using the reference mold. Specifically, the imprint material disposed on the substrate and the reference mold are brought into contact with each other, the imprint material is cured in this state, and then the reference mold is separated from the cured imprint material on the substrate. The imprint process is continuously performed by repeating such processing for each shot region on the substrate, for example.

In step S412, a reference root mean square current value, which is the root mean square current value of the current applied to the actuators 22 when the imprint process is continuously performed using the reference mold, is acquired. For example, assuming that I(t) is the current applied to the actuators 22 and T is the time during which the imprint process is performed continuously (continuous imprint processing time), a reference root mean square current value I_mean_ref is obtained by integrating the following Equation (6) in the range of 0 to T.

$$I\_mean\_ref = \int \{I(t)2 \div T\} dt \quad (6)$$

Note that the reference root mean square current value I_mean_ref can be acquired from the driving profile with regards to driving of the holding member 21b by the actuators 22 for when the imprint process is continuously performed, without continuously performing the imprint process using the reference mold. Specifically, assuming that the driving profile of the holding member 21b is Dm(t), the current value Im(t) corresponding to the position of the holding member 21b at the time of imprint processing is expressed by the following Equation (7).

$$Im(t) = I\_imp\_ref \times (Dm(t) \div D\_imp\_ref) \quad (7)$$

Further, in a state in which the imprint material on the substrate and the reference mold are in contact with each other, the reference mold is pushing against the substrate 1 with a predetermined force; however, the position of the holding member 21b holding the reference mold does not change. At this time, assuming that the force with which the reference mold pushes against the substrate 1 is F_imp, the current value If(t) corresponding to the force F_imp is expressed by the following Equation (8).

$$If(t) = F\_imp(t) \div Km \quad (8)$$

Since the force F_imp(t) is zero when the imprint material on the substrate and the reference mold are not in contact with each other, the current value IF(t) is also zero when the imprint material on the substrate and the reference mold are not in contact with each other. The current I(t) to be applied to the actuators 22 when the imprint process is continuously performed is expressed by the following Equation (9) using the current values Im(t) and If(t).

$$I(t) = Im(t) + If(t) \quad (9)$$

When the holding member 21b performs the same operation continuously, the continuous imprint processing time T only needs to include a time during which the holding member 21b performs the same operation at least once. For example, the result of having performed imprint processing on all of the substrates 1 in one lot may be used, or the result of having performed imprint processing on only one substrate 1 may be used. Further, if the minimum unit for the same operation of the holding member 21b is the imprint processing for one shot region, the result of the imprint processing for one shot region may be used.

In some cases, imprint material is supplied to the entire area of the substrate 1 at once, and then imprint processing is performed successively, and in some cases, supply of imprint material and imprint processing thereafter is performed on a shot-region-by-shot-region basis. In this case, the reference root mean square current value may be acquired from the current I(t) in the imprint process for one shot region.

Further, there are cases where imprint processing is performed continuously for different numbers of shot regions or where the driving profile of the holding member 21b is different between the peripheral shot region and the other shot regions of the substrate 1. In such cases, it is better to acquire the reference root mean square current value from the result of imprint processing for all the shot regions on the substrate. The imprint profile here includes the time for which the holding member 21b is positioned at the imprint position and the orientation thereof at that time. However, the orientation of the holding member 21b can be ignored if the difference in the tilt of the holding member 21b between the peripheral shot regions and the other shot regions of the substrate 1 is 0.2 to 0.3 mrad or less, since the degree of influence is as small as 1 to 2% or less.

In step S414, based on the reference root mean square current value acquired in step S412, the reference standby current value (reference current value) to be applied to the actuators 22 in the idle state before (immediately before) the start of the imprint process is determined. In the present embodiment, the reference root mean square current value I_mean_ref is set as the reference standby current value I_idle_ref as indicated in the following Equation (10).

$$I\_idle\_ref = I\_mean\_ref \tag{10}$$

The various kinds of information about the reference mold obtained in this manner are stored in the storage unit of the imprint apparatus 100. Incidentally, the various kinds of information related to the reference mold include the reference mold thickness H_mld_ref, the reference imprint position D_imp_ref, the reference imprint position current value I_imp_ref, the reference root mean square current value I_mean_ref, and the reference standby current value I_idle_ref.

In step S416, the reference mold is unloaded from the imprint apparatus 100. Specifically, the reference mold is removed from the mold holding unit 20 (the holding member 21b) by the mold conveyance unit 32, and the reference mold is unloaded from the inside of the imprint apparatus 100 to the outside.

Steps S402 to S416 need not be performed each time and may be performed at least one time, for example, when the imprint apparatus 100 is installed.

In step S418, the mold 2 is loaded into the imprint apparatus 100. Specifically, the mold 2 is loaded from the outside of the imprint apparatus 100 to the inside by the mold conveyance unit 32, and then the mold 2 is held by the mold holding unit 20 (the holding member 21b).

In step S420, the thickness (height) of the mold 2 loaded in step S418 is acquired. Specifically, similarly to step S404, a mold 2 thickness H_mld is acquired by measuring the distance to the mold 2 in the second measuring unit 42 while scanning the substrate holding unit 10 in the horizontal direction with respect to the mold 2.

In step S422, the reference mold thickness H_mld_ref acquired in step S404 and the mold 2 thickness H_mld acquired in step S420 are compared.

In step S424, the imprint position which is a position of the holding member 21b at which the imprint material on the substrate and the mold 2 come in contact with each other and the imprint position current value are acquired based on the result of comparison in step S422. Specifically, first, the imprint position D_imp is acquired according to the following Equation (11).

$$D\_imp = D\_imp\_ref - H\_mld + H\_mld\_ref \tag{11}$$

Since the driving amount of the holding member 21b is proportional to the current value applied to the actuators 22, the imprint position current value I_imp applied to the actuators 22 at the time the holding member 21b reaches the imprint position is expressed by the following Equation (12).

$$I\_imp = I\_imp\_ref \times (D\_imp \div D\_imp\_ref) \tag{12}$$

In step S426, the difference in the root mean square current value applied to the actuators 22 between the case where the imprint process is continuously performed using the reference mold and the case where the imprint process is continuously performed using the mold 2 is acquired. The difference in the root mean square current value applied to the actuators 22 when the imprint process is performed continuously between the case where the reference mold is used and the case where the mold 2 is used is the difference in the current value due to the difference in the imprint position. Therefore, when the time during which the holding member 21b is positioned at the imprint position in the continuous imprint processing time T is Ts, a root mean square current value difference I_mean_dif between the case where the reference mold is used and the case where the mold 2 is used is expressed by the following Equation (13).

$$I\_mean\_dif = (I\_imp2 - I\_imp\_ref2) \times Ts \div T \tag{13}$$

In step S428, a difference standby current value (difference current value) due to the difference between the reference mold and the mold 2 in the idle state before (immediately before) the start of the imprint process is acquired based on the root mean square current value difference acquired in step S426. A difference standby current value I_idle_dif is expressed by the following Equation (14).

$$I\_idle\_dif = I\_mean\_dif \tag{14}$$

In step S430, the standby current value to be applied to the actuators 22 in the idle state before the start of the imprint process is determined. In the present embodiment, the sum of the reference standby current value I_idle_ref and the difference standby current value I_idle_dif is determined as the standby current value I_idle, as indicated in the following Equation (15).

$$I\_idle = I\_idle\_ref + I\_idle\_dif \tag{15}$$

In step S432, the holding member 21b is driven in the vertical direction (+Z direction) by applying the standby current value determined in step S430 to the actuators 22. As a result, the holding member 21b is pressed against the regulating surfaces 27a of the regulating members 27. Further, in the idle state, the amount of heat generated by the actuators 22 can be made equal to the amount of heat generated by the actuators 22 when the imprint process is continuously performed using the mold 2. Therefore, by maintaining the state in which the holding member 21b is pressed against the regulating surfaces 27a of the regulating members 27 for a predetermined period, the temperature of the holding member 21b can be made to be in a state equal to a steady state in which the imprint processing is continuously performed.

In step S434, the imprint process is continuously performed using the mold 2. Specifically, the imprint material disposed on the substrate and the mold 2 are brought into contact with each other, the imprint material is cured in this state, and then the mold 2 is separated from the cured imprint material on the substrate. The imprint process is continuously performed by repeating such processing for each shot region on the substrate, for example.

In step S436, the mold 2 is unloaded from the imprint apparatus 100. Specifically, the mold 2 is removed from the mold holding unit 20 (the holding member 21b) by the mold conveyance unit 32, and the mold 2 is unloaded from the inside of the imprint apparatus 100 to the outside.

According to the present embodiment, it is possible to suppress, in accordance with the mold 2 used in the imprint apparatus 100, the transient phenomenon of the temperature of the holding member 21b which occurs at the initial stage of the start of the imprint process, without actually performing the imprint process.

Further, an aspect of changing the standby current value to be applied to the actuators 22 in the idle state before the start of the imprint process in accordance with the thickness of the mold 2 used in the imprint process also constitutes an aspect of the present invention. In this case, it is not always necessary to press the holding member 21b against the regulating surfaces 27a of the regulating members 27 by driving it in the vertical direction (+Z direction); in other words, the regulating members 27 are not always necessary. Also, in such a configuration, it is possible to change the standby position of the holding member 21b in the idle state in accordance with the change in the imprint position due to the thickness of the mold 2. Therefore, the temperature of the holding member 21b can be set to a state equal to a steady state in which the imprint process is continuously performed.

Figure 5:
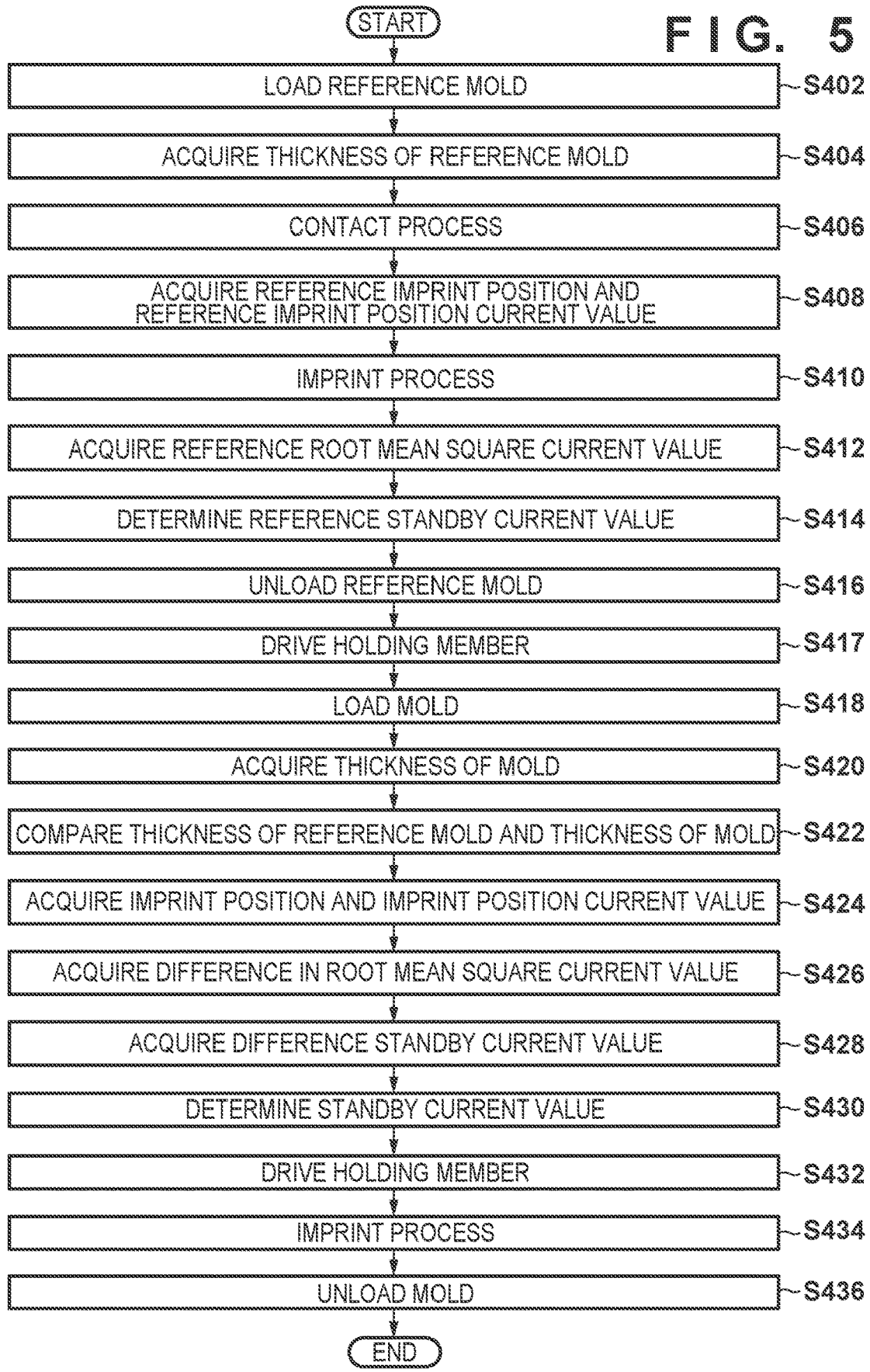
FIG. 5 is a flowchart for explaining an operation of the imprint apparatus illustrated in FIG. 1.

Further, in FIG. 4, after the reference mold is unloaded from the imprint apparatus 100 and the mold 2 is loaded into the imprint apparatus 100, the holding member 21b is pressed against the regulating surfaces 27a of the regulating members 27 by being driven in the vertical direction (+Z direction). However, as illustrated in FIG. 5, the holding member 21b may be pressed against the regulating surfaces 27a of the regulating members 27 by being driven in the vertical direction (+Z direction) after the reference mold is unloaded from the imprint apparatus 100 and before the mold 2 is loaded into the imprint apparatus 100. For example, in step S417 which is between steps S416 and S418, the holding member 21b is driven in the vertical direction (+Z direction) by applying the reference standby current value determined in step S414 to the actuators 22. As a result, the holding member 21b is pressed against the regulating surfaces 27a of the regulating members 27, and the temperature of the holding member 21b can be brought closer to a steady state in which the imprint process is continuously performed. Therefore, it is possible to shorten the waiting time required until the start of the imprint process after the mold 2 is loaded into the imprint apparatus 100 (a predetermined period required for maintaining a state in which the holding member 21b is pressed against the regulating surfaces 27a of the regulating members 27 in step S432).

Figure 6:
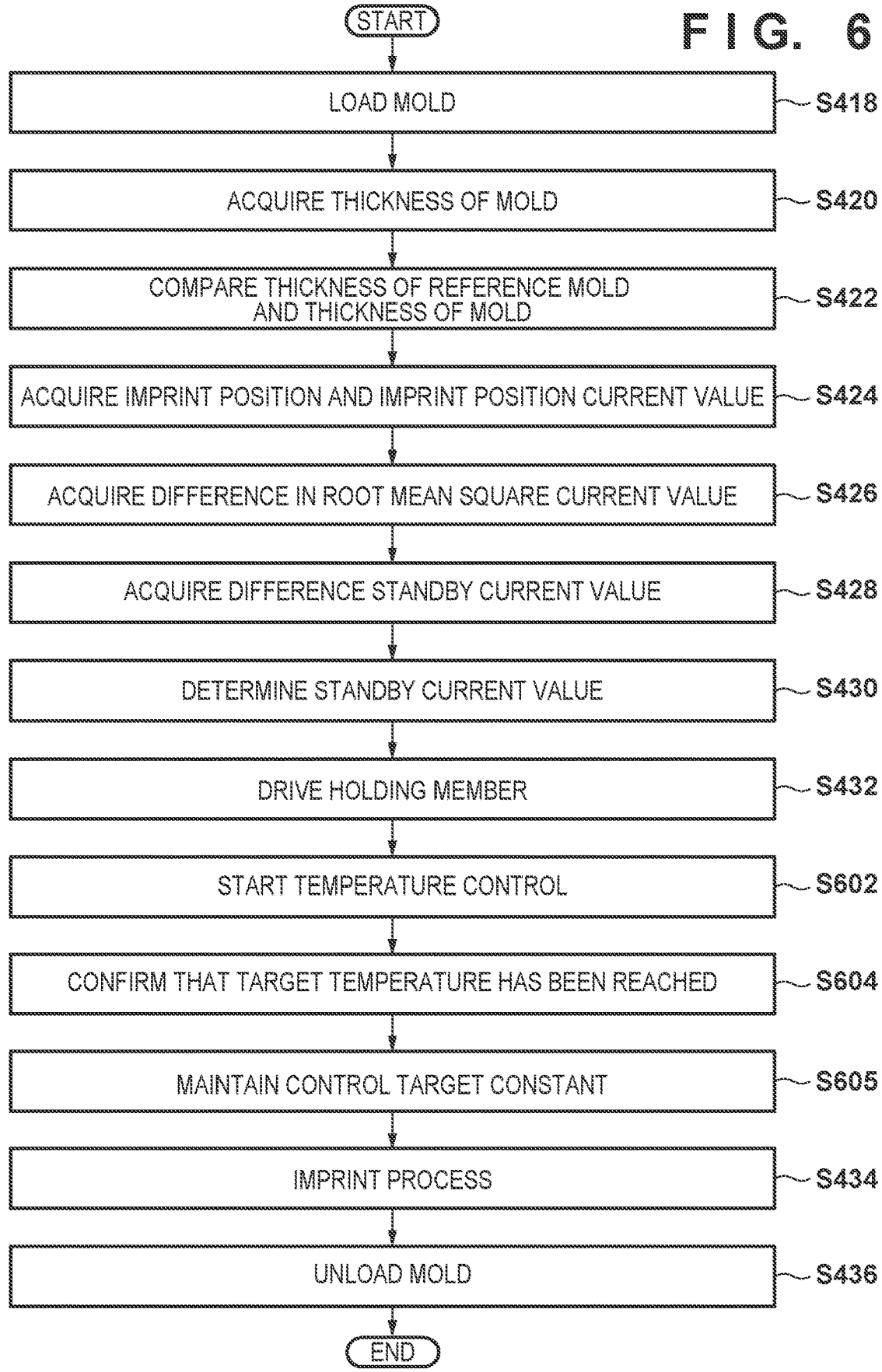
FIG. 6 is a flowchart for explaining an operation of the imprint apparatus illustrated in FIG. 1.

Further, as illustrated in FIG. 6, after pressing the regulating surfaces 27a of the regulating members 27 by driving the holding member 21b in the vertical direction (+Z direction), the temperature of the holding member 21b may be controlled (adjusted). Incidentally, in FIG. 6, the process related to the reference mold, i.e., the process of steps S402 to S416, is not illustrated.

In step S602, the temperature control of the holding member 21b is started. Specifically, the temperature of the holding member 21b is measured by the temperature measuring unit 26, and a fluid is supplied from the adjusting unit 50 to the temperature adjustment target portions 25 based on the temperature measured by the temperature measuring unit 26 so that the holding member 21b reaches the target temperature. At least one of the flow rate, temperature, and pressure of the fluid supplied from the adjusting unit 50 to the temperature adjustment target portions 25 is adjusted so that the temperature of the holding member 21b reaches the target temperature.

In step S604, it is confirmed that the temperature measured by the temperature measuring unit 26 has reached the target temperature. Once the temperature measured by the temperature measuring unit 26 reaches the target temperature, the temperature is maintained so as to stay within the target temperature threshold, and a state in which the control target (at least one of flow rate, temperature, and pressure) of the fluid supplied from the adjusting unit 50 is substantially constant is awaited.

In step S605, after the control target of the fluid supplied from the adjusting unit 50 has become substantially constant, then a predetermined period has elapsed, the control target of the fluid supplied from the adjusting unit 50 is maintained constant (fixed).

Thus, by continuously performing the imprint process after the temperature measured by the temperature measuring unit 26, i.e., the temperature of the holding member 21, is adjusted to the target temperature, then a predetermined period has elapsed, it is possible to suppress the transient phenomenon of the temperature of the holding member 21b which occurs at the initial stage of the start of the imprint process. The temperature shift component of the holding member 21b can also be adjusted. For example, by providing the temperature measuring unit to the substrate holding unit 10, it is also possible to align the temperature of the holding member 21b and the temperature of the substrate holding unit 10. Further, by maintaining the control target of the fluid supplied from the adjusting unit 50 to the temperature adjustment target portions 25 constant, disturbance caused by the fluid can be suppressed, and the overlay accuracy can be improved.

The pattern of a cured product formed using the imprint apparatus 1 (the imprint method according the present invention) is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, a SRAM, a flash memory, and a MRAM and semiconductor elements such as an LSI, a CCD, an image sensor, and an FPGA. Examples of the mold are molds for imprint.

The pattern of the cured product is directly used as the constituent member of at least some of the above-described articles or used temporarily as a resist mask. After etching or ion implantation is performed in the substrate processing step, the resist mask is removed.

Figure 7A:
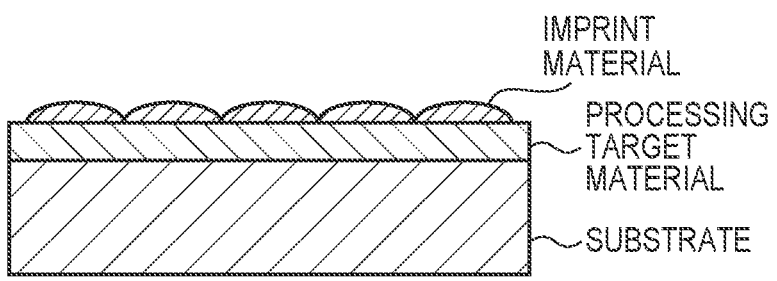
FIGS. 7A to 7F are views for describing an article manufacturing method.

Next, description regarding a detailed method of manufacturing an article is given. As illustrated in FIG. 7A, the substrate such as a silicon wafer with a processing target material such as an insulator formed on the surface is prepared. Next, an imprint material is applied to the surface of the processing target material by an inkjet method or the like. A state in which the imprint material is applied as a plurality of droplets onto the substrate is illustrated here.

Figure 7B:
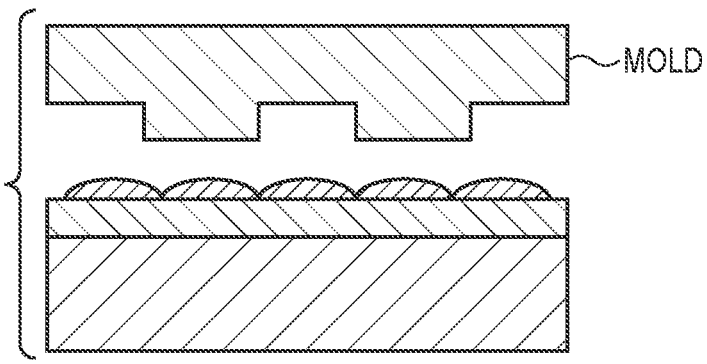
Figure 7C:
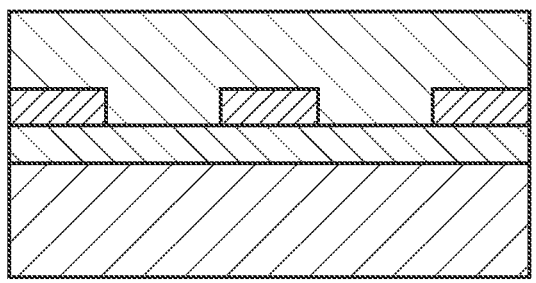

As illustrated in FIG. 7B, a side of the mold for imprint with a projection and groove pattern is formed on and caused to face the imprint material on the substrate. As illustrated in FIG. 7C, the substrate to which the imprint material is applied is brought into contact with the mold, and a pressure is applied. The gap between the mold and the processed material is filled with the imprint material. In this state, when the imprint material is irradiated with light serving as curing energy through the mold, the imprint material is cured.

Figure 7D:
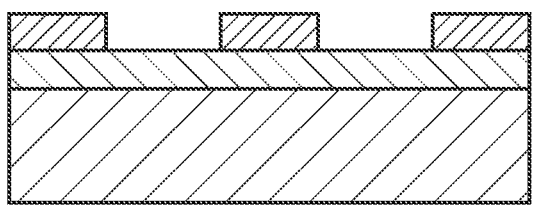

As illustrated in FIG. 7D, after the imprint material is cured, the mold is released from the substrate. Thus, the pattern of the cured product of the imprint material is formed on the substrate. In the pattern of the cured product, the groove of the mold corresponds to the projection of the cured product, and the projection of the mold corresponds to the groove of the cured product. That is, the projection and groove pattern of the mold is transferred to the imprint material.

Figure 7E:
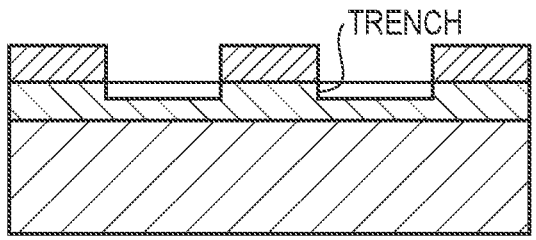
Figure 7F:
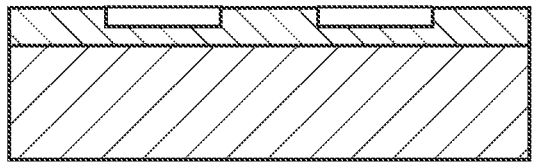

As illustrated in FIG. 7E, when etching is performed using the pattern of the cured product as an etching resistant mask, a portion of the surface of the processed material where the cured product does not exist or remains thin is removed to form a groove. As illustrated in FIG. 7F, when the pattern of the cured product is removed, an article with the grooves formed in the surface of the processed material can be obtained. The pattern of the cured material is removed here, but, for example, the pattern may be used as a film for insulation between layers included in a semiconductor element or the like without being removed after processing, in other words as a constituent member of the article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2021-001045 filed on Jan. 6, 2021, which is hereby incorporated by reference herein in its entirety.

What is claimed is:

1. An imprint apparatus that performs an imprint process in which a pattern of an imprint material is formed on a substrate using a mold, the apparatus comprising:
   a holding member configured to hold the mold;
   a spring member configured to connect the holding member to a base unit that supports the holding member;
   a driving unit provided between the holding member and the base unit and configured to drive the holding member in a vertical direction with respect to the base unit; and
   a regulating member that is separate from the driving unit and connected to the base unit, the regulating member configured to regulate by contact, in a vertical range in which the holding member is drivable by the driving unit, a driving end of the holding member on a side that is towards the base unit, wherein the regulating member regulates driving of the holding member by contacting the holding member,
   wherein the driving unit
      performs first driving for causing the mold to come in contact with the imprint material on the substrate and second driving for pressing the holding member against the regulating member, and
      in the second driving, generates heat while pressing the holding member against the regulating member, and
   wherein the regulating member
      is arranged on the side that is towards the base unit with respect to a first position of the holding member at which gravity that is acting on the holding member in a state in which the holding member is holding the mold and an elastic force of the spring member are balanced,
      is arranged such that a distance between the regulating member and the first position is shorter than a distance between a second position of the holding member at which the imprint material on the substrate and the mold come in contact and the first position, and
      regulates driving of the holding member in the vertical direction.

2. The imprint apparatus according to claim 1, wherein the driving unit, in the first driving, drives the holding member towards the side that is opposite to the side that is towards the base unit and, in the second driving, drives the holding member towards the side that is towards the base unit.

3. The imprint apparatus according to claim 1, wherein the driving unit, in the imprint process, performs the first driving and, in an idle state before a start of the imprint process, performs the second driving.

4. The imprint apparatus according to claim 1, further comprising:
   a control unit configured to control a current value to be applied to the driving unit in order to drive the holding member,
   wherein the control unit, in the second driving, controls the current value to be applied to the driving unit such that a root mean square current value of the current to be applied to driving unit is equal to the root mean square current value of a current to be applied to driving unit when the imprint process is continuously performed.

5. An article manufacturing method comprising:
   forming a pattern on a substrate using an imprint apparatus;
   processing the substrate on which the pattern is formed in the forming; and
   manufacturing an article from the processed substrate,
   wherein the imprint apparatus performs an imprint process in which a pattern of an imprint material is formed on the substrate using a mold and includes:
      a holding member configured to hold the mold;
      a spring member configured to connect the holding member to a base unit that supports the holding member;
      a driving unit provided between the holding member and the base unit and configured to drive the holding member in a vertical direction with respect to the base unit; and
      a regulating member that is separate from the driving unit and connected to the base unit, the regulating member configured to regulate by contact, in a vertical range in which the holding member is drivable by the driving unit, a driving end of the holding member on a side that is towards the base unit, wherein the regulating member regulates driving of the holding member by contacting the holding member, wherein the driving unit
performs first driving for causing the mold to come in contact with the imprint material on the substrate and second driving for pressing the holding member against the regulating member, and
in the second driving, generates heat while pressing the holding member against the regulating member, and wherein the regulating member
is arranged on the side that is towards the base unit with respect to a first position of the holding member at which gravity that is acting on the holding member in a state in which the holding member is holding the mold and an elastic force of the spring member are balanced,
is arranged such that a distance between the regulating member and the first position is shorter than a distance between a second position of the holding member at which the imprint material on the substrate and the mold come in contact and the first position, and
regulates driving of the holding member in the vertical direction.

6. The imprint apparatus according to claim 1, wherein the regulating member restricts a movement of the holding member to be less than the vertical range in which the holding member is drivable by the driving unit.

* * * * *